(12) United States Patent
Kiwada

(10) Patent No.: US 7,428,067 B2
(45) Date of Patent: Sep. 23, 2008

(54) IMAGE FORMING DEVICE, IMAGE FORMING METHOD, IMAGE FORMING PROGRAM, COMPUTER READABLE RECORDING MEDIUM ON WHICH THE PROGRAM IS RECORDED

(75) Inventor: Masakatsu Kiwada, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 973 days.

(21) Appl. No.: 10/802,742

(22) Filed: Mar. 18, 2004

(65) Prior Publication Data

US 2005/0141009 A1 Jun. 30, 2005

(30) Foreign Application Priority Data

Dec. 26, 2003 (JP) ............................. 2003-435734

(51) Int. Cl.
G06F 15/00 (2006.01)
G06F 19/00 (2006.01)
(52) U.S. Cl. .................... 358/1.14; 358/1.12; 358/1.16; 358/453; 235/375; 235/382; 235/462.01; 235/492; 235/494
(58) Field of Classification Search ................ 358/1.12, 358/1.14, 1.16, 453; 235/375, 382, 462.01, 235/492, 494
See application file for complete search history.

(56) References Cited

U.S. PATENT DOCUMENTS 6,585,154 B1 * 7/2003 Ostrover et al. ............. 235/375
6,674,923 B1 * 1/2004 Shih et al. ................... 382/305
6,827,279 B2 * 12/2004 Teraura ....................... 235/492

FOREIGN PATENT DOCUMENTS

| JP | 6-291895 A | 10/1994 |
|---|---|---|
| JP | 10-334215 A | 12/1998 |
| JP | 2000-285203 A | 10/2000 |
| JP | 2001-024845 A | 1/2001 |
| JP | 2001024845 A * | 1/2001 |
| JP | 2002-209039 A | 7/2002 |
| JP | 2002-337426 A | 11/2002 |

OTHER PUBLICATIONS

Japanese Office Action (with English translation) dated Dec. 20, 2005.

* cited by examiner

Primary Examiner—Edward L. Coles
Assistant Examiner—Chan S Park
(74) Attorney, Agent, or Firm—Buchanan Ingersoll & Rooney PC

(57) ABSTRACT

MFP transports the document one sheet at a time by means of ADF to a specified reading position, and judges whether copy-prohibiting information exists in the attribute information recorded on an IC tag or not by an IC tag reader. If no copy-prohibiting information exists, it prints the image data acquired from the IC tag by IC tag reader by a printing unit. On the other hand, if copy-prohibiting information exists, it processes it by either one of the methods of blank output or no output according to the user's choice. Thus, the document can be processed appropriately when the IC-tagged document contains copy-prohibiting information in the attribute information.

27 Claims, 11 Drawing Sheets

310
- <HEADDER>
- <DOCUMENT ID>000001</DOCUMENT ID>
- <PAGE NUMBER>1</PAGE NUMBER>
- <COPYING PERMISSION>YES</COPYING PERMISSION>
- <MODIFIABLE ATTRIBUTES>COLOR, RESOLUTION, FONT SIZE, FONT COLOR, FONT TYPE</MODIFIABLE ATTRIBUTE>
- </HEADDER>

320
- <IMAGE DATA>
- <COLOR>FULL COLOR</COLOR>
- <RESOLUTION>600 dpi</RESOLUTION>
- <FONT SIZE>72 pt</FONT SIZE>
- <FONT COLOR>RED</FONT COLOR>
- <FONT TYPE>GOTHIC</FONT TYPE>
- ABC
- </IMAGE DATA>

THIS DOCUMENT IS NOT ALLOWED TO BE COPIED.
THE PROCESS WILL BE CANCELLED.

THIS DOCUMENT HAS AN IC TAG. THE IC TAG STORES THE ORIGINAL IMAGE DATA OF THE DOCUMENT. PRINTING OF HIGH IMAGE QUALITY CAN BE OBTAINED IF THE ORIGINAL IMAGE DATA IS USED. HOWEVER, THE PORTION ADDED BY HANDWRITING WILL BE LOST.

DO YOU WANT TO USE THE ORIGINAL IMAGE DATA STORED IN THE IC TAG.

YES　　　NO

COPY-PROHIBITED DOCUMENT IS INCLUDED. DO YOU WANT TO CONTINUE PROCESS ON DOCUMENTS ALLOWED TO BE COPIED?

CONTINUE    STOP

PLEASE SPECIFY THE PROCESSING METHOD FOR COPY-PROHIBITED DOCUMENTS.

OUTPUT BLANK PAPER

NO PRINTING

IMAGE FORMING DEVICE, IMAGE FORMING METHOD, IMAGE FORMING PROGRAM, COMPUTER READABLE RECORDING MEDIUM ON WHICH THE PROGRAM IS RECORDED

This application is based on Japanese Patent Application No. 2003-435734 filed on Dec. 26, 2003, the contents of which are hereby incorporated by reference.

BACKGROUND OF THE INVENTION

1. Field of the Invention

The invention relates to a printed matter equipped with an electronic tag and an image forming device for copying them or other purposes, in particular, a electronically tagged printed matter and an image forming device capable of allowing the user to use attribute information of the printed matter or original image data during copying.

2. Description of Related Art

Printed matters that hold the attribute information thereof on themselves by using printing paper with an IC tag, which is embedded in a certain part of printing paper, and image forming devices that allow the users to use the attribute information by reading it from the IC tag during the printing process have been known (e.g., JP-2001-24845A). These printing matters and devices are capable of providing outputs that reflect attribute information of the printed matters during copying, for example, overlaying noises on printed matters when there is information that prohibits copying. However, since said printed matters and devices are based on the optical copying technology, there are inherent problems, e.g., deterioration of images of copies.

Various image forming devices that read identifiers attached to the printed matter when copying the printed matter, and download from a server corresponding original image data for printing (e.g., JP-2002-209039A). Such devices can maintain image quality on copies equivalent to that of the original printed matter as the original image data for the printed matter can be used on copies. However, said devices can be used only under environments where dedicated servers, networks and other facilities are built in.

In the meanwhile, certain recording media such as IC cards have been known wherein image data recorded on said recording media are printed on the surfaces of the substrates (e.g., JP-10-334215A). However, the image on the surfaces of the substrates of those recording media are printed simply for the purpose of easy visual recognitions of the image data recorded on said recording media, and they don't have sufficient characteristics for being distributed as printed matters or to be copied.

SUMMARY OF THE INVENTION

As a means of solving the above mentioned problems of the prior art, the applicant of the present invention is filing simultaneously a patent application for an electronically tagged printed matter that is capable of keeping the attribute information and original image data of printed matter on the printed matter themselves using IC-tagged printing paper wherein an IC tag is embedded in certain parts of the printing paper as well as an image forming device that is capable of reading out and using the attribute information and original image data of the printed matter from the IC tag during the copying process of such a printed matter. Using such a device and a printed matter makes it possible to use during the copying process the attribute information and original image data of the printed matter held on the printed matter themselves, so that copies of high image quality reflecting the attribute information can be obtained. However, there has been no known image forming device that is capable of executing copying processes reflecting copy-prohibiting information on the processes in case the attribute information of said printed matter contains information that prohibits copying of original image data, in particular, there has been no known image forming device capable of properly processing documents depending upon presence or absence of copy-prohibiting information in case there is a mixture of IC-tagged printed matter containing copy-prohibiting information and IC-tagged printed matter not containing copy-prohibiting information.

The invention is therefore intended for providing an image forming device capable of reading out and using attribute information and original image data of printed matter from electronic tag during the copying process of electronically tagged printed matter, in particular, an image forming device capable of processing a document properly when the document is an electronically tagged printed matter which contains copy-prohibiting information in its attribute information.

The invention also intends to provide said image forming device capable of properly processing documents depending of the types of documents in case the documents is a mixture of electronically tagged printed matter containing copy-prohibiting information and electronically tagged printed matter not containing copy-prohibiting information.

Said objective of the present invention can be accomplished by the following means:

(1) An image forming device comprising: a first reading unit for reading attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a judging unit for judging whether copy-prohibiting information exists in the attribute information read by said first reading unit or not; a second reading unit for reading image data from said electronic tag when said judging unit judges that no copy-prohibiting information exists; and a printing unit for printing image data read by said second reading unit; wherein said second reading unit does not read the image data from said electronic tag when said judging unit judges that copy-prohibiting information exists; and said printing unit cancels printing process when said judging unit judges that copy-prohibiting information exists.

(2) An image forming device comprising: a transporting unit for transporting an electronically tagged printed matter wherein image data is printed on an electronically tagged printing paper equipped with an electronic tag for storing electronic data in a certain part of the printing paper and said electronic tag stores image data printed on said electronically tagged printing paper, one sheet at a time to a specified reading position; a first reading unit for reading attribute information of the electronically tagged printed matter transported by said transporting unit from its electronic tag; a judging unit for judging whether copy-prohibiting information exists in the attribute information read by said first reading unit or not; a second reading unit for reading image data from the electronic tag of the electronically tagged printed matter which is judged that no copy-prohibiting information exists in the attribute information by said judging unit; and a printing unit for printing image data read by said second reading unit; wherein said second reading unit does not read image data from the electronic tag of the electronically tagged printed matter which is judged that copy-prohibiting information exists in the attribute information by said judging unit.

(3) An image forming method comprising: a first reading step of reading attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a judging step of judging whether copy-prohibiting information exists in the attribute information read by said first reading step or not; a second reading step of reading image data from said electronic tag when said judging step judges that no copy-prohibiting information exists; and a printing step of printing image data read by said second reading step; wherein said second reading step does not read the image data from said electronic tag when said judging step judges that copy-prohibiting information exists; and said printing step cancels printing process when said judging step judges that copy-prohibiting information exists.

(4) An image forming method comprising: a transporting step of transporting an electronically tagged printed matter wherein image data is printed on an electronically tagged printing paper equipped with an electronic tag for storing electronic data in a certain part of the printing paper and said electronic tag stores image data printed on said electronically tagged printing paper, one sheet at a time to a specified reading position; a first reading step of reading attribute information of the electronically tagged printed matter transported by said transporting step from its electronic tag; a judging step of judging whether copy-prohibiting information exists in the attribute information read by said first reading step or not; a second reading step of reading image data from the electronic tag of the electronically tagged printed matter which is judged that no copy-prohibiting information exists in the attribute information by said judging step; and a printing step of printing image data read by said second reading step; wherein said second reading step does not read image data from the electronic tag of the electronically tagged printed matter which is judged that copy-prohibiting information exists in the attribute information by said judging step.

(5) An image forming program for causing an image forming device to execute: a first reading step of reading attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a judging step of judging whether copy-prohibiting information exists in the attribute information read by said first reading step or not; a second reading step of reading image data from said electronic tag when said judging step judges that no copy-prohibiting information exists; and a printing step of printing image data read by said second reading step; wherein said second reading step does not read the image data from said electronic tag when said judging step judges that copy-prohibiting information exists; and said printing step cancels printing process when said judging step judges that copy-prohibiting information exists.

(6) An image forming program for causing an image forming device to execute: a transporting step of transporting an electronically tagged printed matter wherein image data is printed on an electronically tagged printing paper equipped with an electronic tag for storing electronic data in a certain part of the printing paper and said electronic tag stores image data printed on said electronically tagged printing paper, one sheet at a time to a specified reading position; a first reading step of reading attribute information of the electronically tagged printed matter transported by said transporting step from its electronic tag; a judging step of judging whether copy-prohibiting information exists in the attribute information read by said first reading step or not; a second reading step of reading image data from the electronic tag of the electronically tagged printed matter which is judged that no copy-prohibiting information exists in the attribute information by said judging step; and a printing step of printing image data read by said second reading step; wherein said second reading step does not read image data from the electronic tag of the electronically tagged printed matter which is judged that copy-prohibiting information exists in the attribute information by said judging step.

(7) A computer readable recording medium on which the image forming program as described in (5) is recorded.

BRIEF DESCRIPTION OF THE DRAWINGS

FIG. 4 is a diagram for describing electronic data recorded on an IC tag 212 of IC-tagged document 200.

FIG. 7 is an example screen to be displayed on a touch panel of operating unit 130 of MFP 100A.

FIG. 8 is an example screen to be displayed on a touch panel of operating unit 130 of MFP 100A.

FIG. 13 is a flowchart showing the sequence of image forming process by means of MFP 100B.

FIG. 14 is an example screen to be displayed on a touch panel of operating unit 130 of MFP 100B.

DESCRIPTION OF THE PREFERRED EMBODIMENTS

The preferred embodiments of the invention will be described in detail below with reference to the accompanying drawings.

Figure 1:
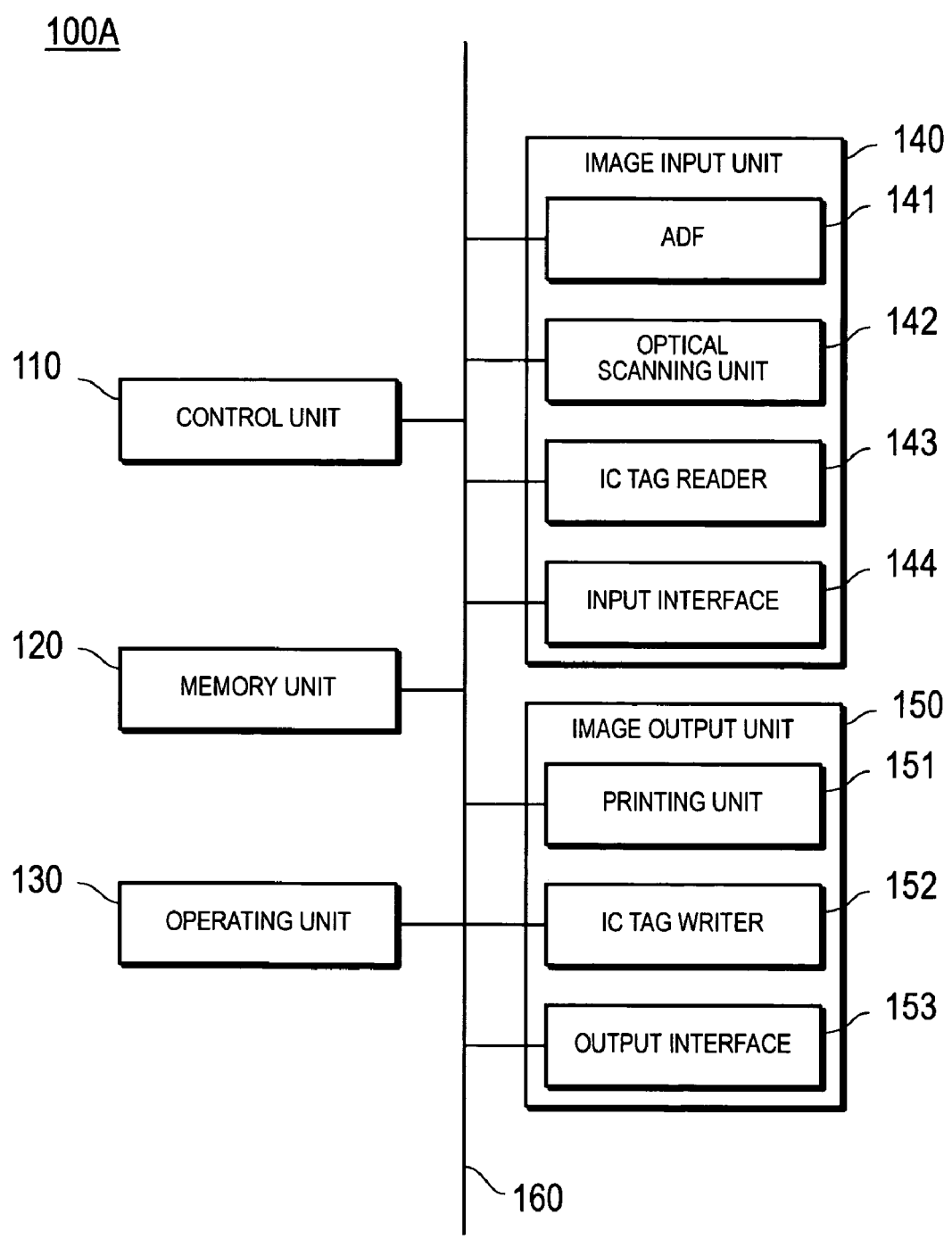
FIG. 1 is a block diagram showing the constitution of MFP 100A according to a first embodiment of the invention.
Figure 2:
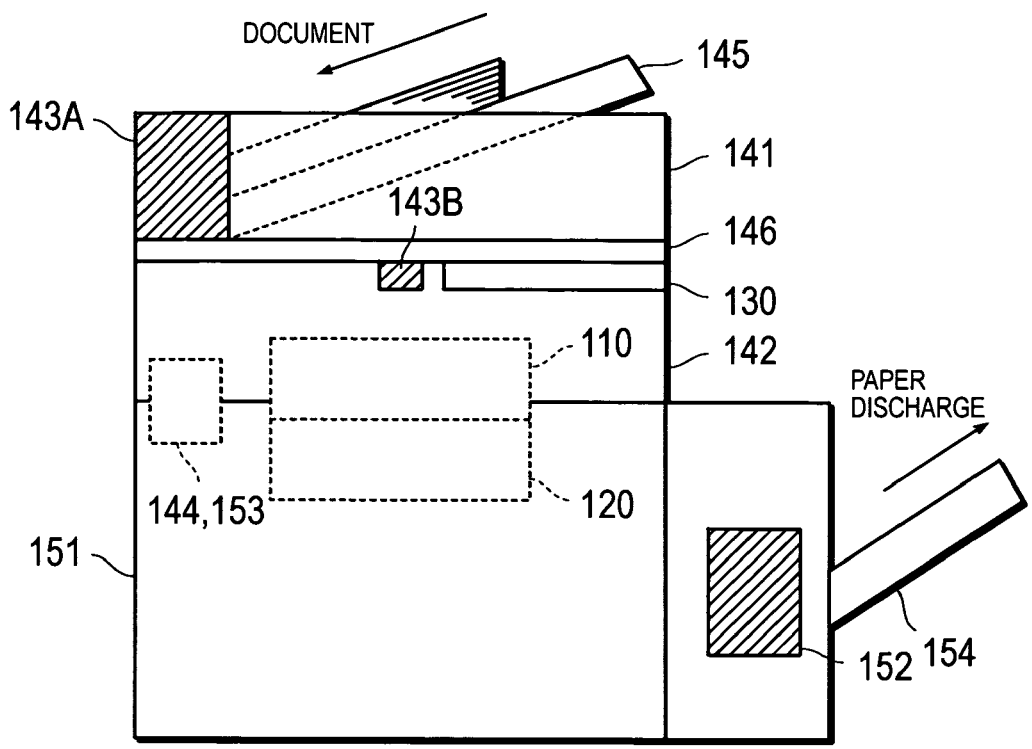
FIG. 2 is a block diagram showing the constitution of MFP 100A.

FIG. 1 and FIG. 2 are the block diagram and the schematic diagram of MFP (Multiple Function Peripheral) 100A as an image forming device of the first embodiment of the present invention. As can be seen from FIG. 1 and FIG. 2, MFP 100A is equipped with a control unit 110, a memory unit 120, an operating unit 130, an image input unit 140, and an image output unit 150, all of which are interconnected to exchange signals with each other via bus 160.

The control unit 110 is a CPU, and controls various parts indicated above and executes various arithmetic processes according to a program.

The memory unit 120 includes a ROM for storing various programs and parameters, a RAM for temporarily storing programs and data, a hard disk used for storing various programs and data, or temporarily storing image data obtained from image processing, and others.

Operating unit 130 consists of a touch panel for displaying various information and entering various setup inputs, a ten key pad for setting up the number of copies to make and others, a start key for instructing the start of operation, a stop key for instructing the operation to stop, various fixed keys such as a reset key for initializing various setup conditions, indicator lamps, etc.

Image input unit 140 consists of an ADF (Auto Document Feeder) 141, an optical scanning unit 142, an IC tag reader 143, an input interface 144, etc.

ADF 141 transports a single or multiple sheets of paper set on document tray 145, transports them one sheet at a time to a specified scanning position of document table 146, and discharges the document sequentially after scanning it.

Optical scanning unit 142 irradiates a document set on the specified scanning position of document table 146 or transported to the location by the ADF with a light source such as a fluorescent lamp and the like, converts reflected lights from the document surface into electrical signals with the help of light sensitive devices such as CCD or CIS, and generates image data (bitmap data) from the electrical signals.

IC tag reader 143 reads the electronic data recorded on the non-contacting type IC tag of the IC-tagged document to be described later. As the communication system between IC tag reader 143 and the IC tag, those of the international standards such as ISO 14443 and ISO 15693 can be applied using frequency bands such as 135 kHz, 13.56 MHz, and 2.45 GHz. However, the communication systems that can be applied are not limited to those mentioned above, and other known communication systems or proprietary communication systems may be used. The IC tag reader may be able to read all the electronic data recorded on a plurality of IC tags within the communicable range simultaneously.

IC tag reader 143A reads the electronic data recorded on the non-contacting type IC tag of the IC-tagged document set on document tray 145. In order to prevent IC tag reader 143A from detecting by mistake IC tags existing in the vicinity of MFP 10A, other than the tags of the IC-tagged document set on document tray 145, it is designed specifically for short distance communications within a proper distance range, for example, within several centimeters to several tens of centimeters.

IC tag reader 143B reads electronic data recorded on non-contacting type IC tags of the IC-tagged document transported to the specified scanning position of document table 146 by ADF 141. In order to prevent IC tag reader 143B from detecting by mistake IC tags existing in the vicinity of, but not mounted on the IC-tagged document transported to document table 146 by ADF 141, it is designed specifically for short distance communications within a proper distance range, for example, within several millimeters to several tens of centimeters. A metallic plate is provided between ADF 141 and document table 146 to prevent wireless communications between them in such a way that IC tag reader 143A cannot detect the IC tags of the IC-tagged document on document table 146, while IC tag reader 143B cannot detect the IC tags of the IC-tagged document on document table 145.

Input interface 144 is an interface for receiving input such as image data from external equipment, for which local connection interfaces, e.g., network interfaces such as Ethernet®, Token Ring, and FDDI standards, serial interfaces such as USB and IEEE 1394, parallel interfaces such as SCSI, IEEE1284, and wireless communication interfaces such as Bluetooth, IEEE 802.11, HomeRF, IrDA, as well as telephone circuit interfaces for connection to telephone circuits can be used.

Image output unit 150 consists of printing unit 151, IC tag writer 152, output interface 153, etc.

Printing unit 151 prints image data to printing paper by the electronic photography method through the steps of electric charging, exposure, development, transfer and fixing, and discharges the printed paper to a paper discharge tray 154.

IC tag writer 152 is used to write electronic data on non-contacting type IC tag on the IC-tagged printing paper to be described later. A device designed for short distance communications similar to the one for IC tag reader 143B is used as IC tag writer 152, and the system for communications between IC tag writer 152 and IC tags can be similar to the one used for IC tag readers 143A and 143B.

Output interface 153 is an interface for transmitting image files to external equipment and an interface similar to said input interface 144 can be used.

Because of the abovementioned constitutions, MFP 100A has all of the functions as a scanner for scanning the document and transmitting image data to external equipment, as a printer for printing the image data received from external equipment, as a copying machine for scanning the document image and printing it, and as a facsimile machine for receiving and transmitting image data through telephone circuits.

MFP 100A may contain constitutional elements other than those described above, or may not include a portion of the abovementioned elements. In this embodiment, for example, image input unit 140 does not necessarily have to have input interface 144, and output unit 150 does not have to have output interface 153.

Figure 3:
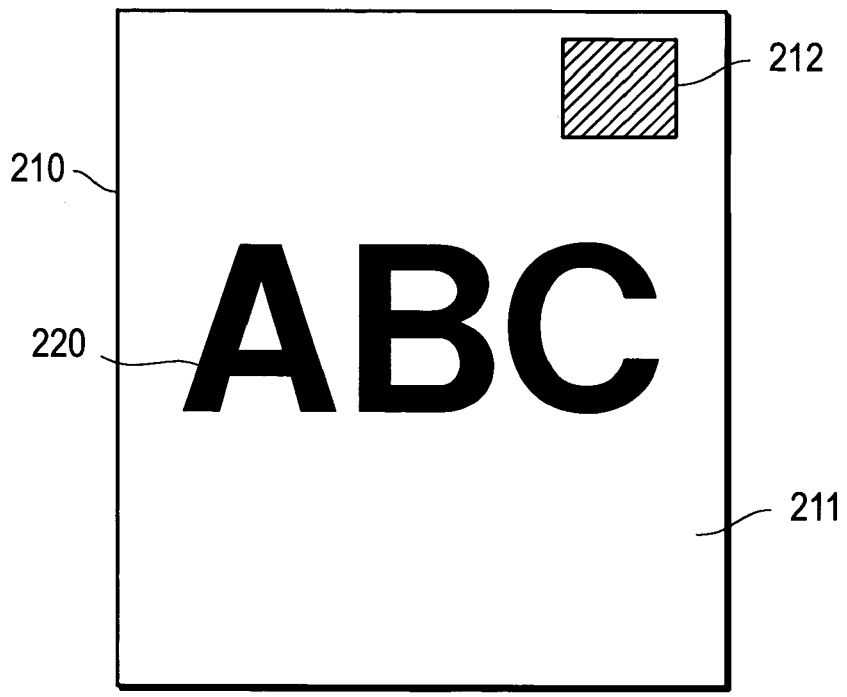
FIG. 3 is a schematic diagram showing a constitution of an IC-tagged document 200.

Next, let us describe the IC-tagged document according to this embodiment referring to FIG. 3 and FIG. 4. FIG. 3 is a schematic diagram showing a constitution of an IC-tagged document 200 according to this embodiment. As shown in FIG. 3, IC-tagged document 200 is a printed matter having an image 220 printed on IC-tagged printing paper 210 wherein an IC tag 212 is embedded on a certain part of a printing paper 211 made of paper, plastic film and others, and original image data concerning image 220, which is printable by MFP 10A, is recorded on IC tag 212 of IC-tagged document 200.

IC tag 212 is a non-contacting type electronic tag using wireless communication equipped with a memory unit (not shown) consisting of IC chips and an antenna unit (not shown) consisting of a coil built inside the chip, conducts wireless communications with IC tag readers 143A and 143B, or IC tag writer 152 by means of electromagnetic induction coupling receiving radio waves emitted by IC tag readers 143 and IC tag writer 152 to read and write electronic data. With the development of minute IC tags with a typical thickness of 0.25 mm, which can be embedded in a printing sheet made of paper or other materials, in recent years, it is expected that a large amount of information will soon be stored in IC tags as the memory capacities of IC chips have been increasing rapidly.

FIG. 4 is a diagram for describing the contents of the electronic data stored in IC tag 212. As can be seen from FIG. 4, the memory unit of IC tag 212 stores electronic data 300. Electronic data 300 is described in the XML format, and contains a header part 310 storing attribute information of IC-tagged document 200 such as a document ID specific to the document and a page number, and an image data part 320 storing the original image data concerning image 220 printed on IC-tagged printing paper 210. However, the type of the information and the format of the electronic data recorded on IC tag 212 are not limited to those examples.

Further, IC-tagged printing paper 210 shown in FIG. 3 is not limited to the format shown in the figure; for example, IC tag 212 can be as large as to cover substantially the entire surface of printing paper 211, or a plurality of IC tags 212 are distributed substantially over the entire surface of printing paper 211 to be embedded therein.

Figure 5:
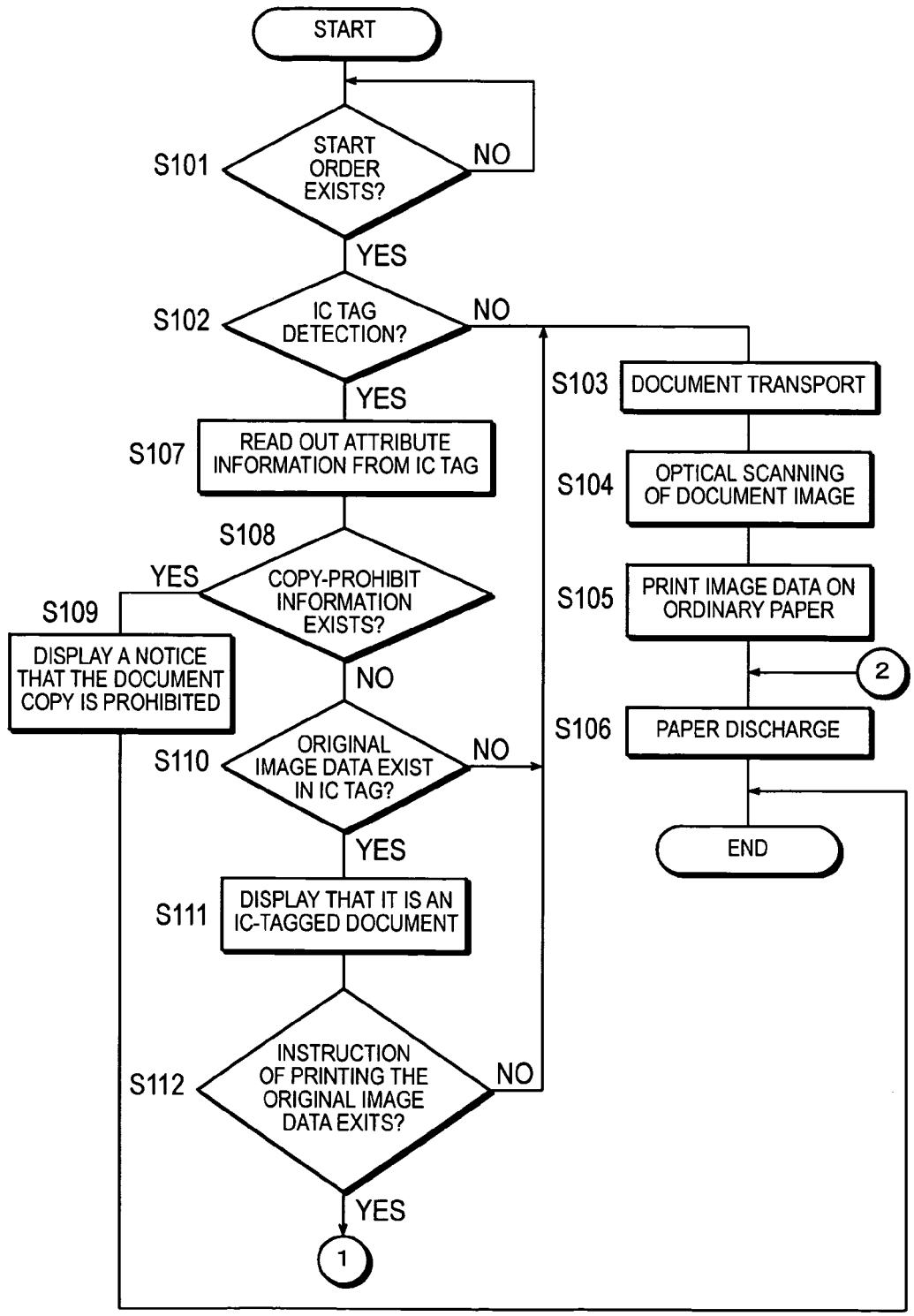
FIG. 5 is a flowchart showing the sequence of image forming process by means of MFP 100A.
Figure 6:
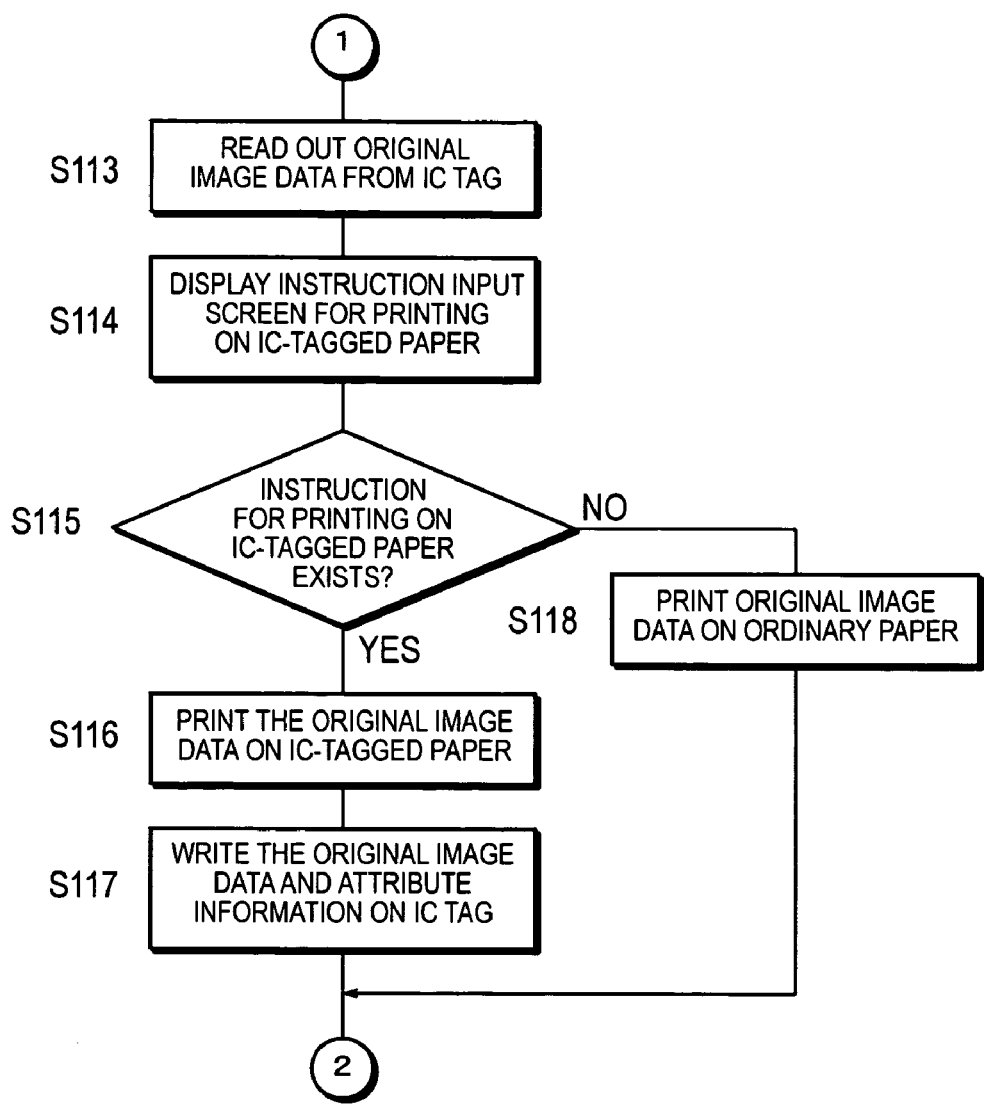
FIG. 6 is a flowchart showing the sequence of image forming process by means of MFP 100A.

Next, the outline of MFP 100A according to this embodiment will be described below. FIG. 5 and FIG. 6 represent a flowchart showing the image forming process of MFP 100A according to this embodiment. The algorithm indicated by the flowchart of FIG. 5 and FIG. 6 is stored as a control program on memory 120 of MFP 100A, read out and executed by control unit 110 when the operation starts.

In FIG. 5, MFP 100A stands by until it is ordered to start image processing (S101: No). The user sets the document on document tray 145, specifies the printing condition such as the number of copies to be printed and the type and size of printing paper from operating unit 130, and presses the start key.

Upon receiving an instruction for startup from operating unit 130 (S101: Yes), MFP 100A searches an IC tag of the document set on document tray 145 by means of IC tag reader 143A, and makes a judgment whether the document is an IC-tagged document or not (S102). If an IC tag is not detected in step S102, it judges that the document set on document tray 145 is a normal document (S102: No), transports the document set on document tray 145 to the specified scanning position of document table 146 by means of ADF 141 (S103), scans the document image by optical scanning unit 142 and converts it to image data (S104), prints it on conventional paper according to the printing condition by means of printing unit 151 (S105), and discharge the printed paper into discharge tray 154 (S106).

If an IC tag is detected in step S102, it judges that the document set on document tray 145 is an IC-tagged document (S102: Yes), reads the attribute information of said document by means of IC tag reader 143A from the IC tag of the IC-tagged document set on document tray 145 to store it into memory unit 120 (S107), and determines whether any copy-prohibiting information is included in the attribute information read out (S108). The copy-prohibiting information here is attribute information indicating that said document is prohibited from copying. In case of electronic data 300 shown in FIG. 4, the attribute information recorded in the IC tag contains prohibiting information, i.e., a "Copy Permission" tag that indicates whether document copying is prohibited or allowed, and MFP 100A determines that copying of the particular document is allowed if the parameter of "Copy Permission" tag is "Yes" and the copying is prohibited if it is "No."

If it is determined in step S108 that the copy-prohibiting information is contained in the attribute information (S108: Yes), it displays on the touch panel of operating unit 130 that copying of the document is prohibited as shown in screen 410 of FIG. 7 (S109), and cancels the image forming process.

On the other hand, if it is determined in step S108 that the copy-prohibiting information is not contained in the attribute information (S108: No), it further makes judgment whether the IC tag of the IC-tagged documents contains original image data or not by means of IC tag reader 143A (S110); if no original image data is recorded in the IC tag (S110: No), it transports the document and prints the image data obtained by optical scanning as in the case of conventional documents (S103-S106).

If it is detected that the original image data is recorded in the IC tag in step S110 (S110: Yes), it displays on the touch panel of control unit 130 as shown in a screen 420 of FIG. 8 that the document is an IC-tagged document and the original image data is recorded in the IC tag (S111), and accepts an instruction on whether the original image data on the IC tag is to be printed or not (S112). If it receives an instruction for not printing the original image data (S112: No), it transports the document and prints the image data obtained by optically scanning same as in the case of a conventional document (S103-S106).

Figure 9:
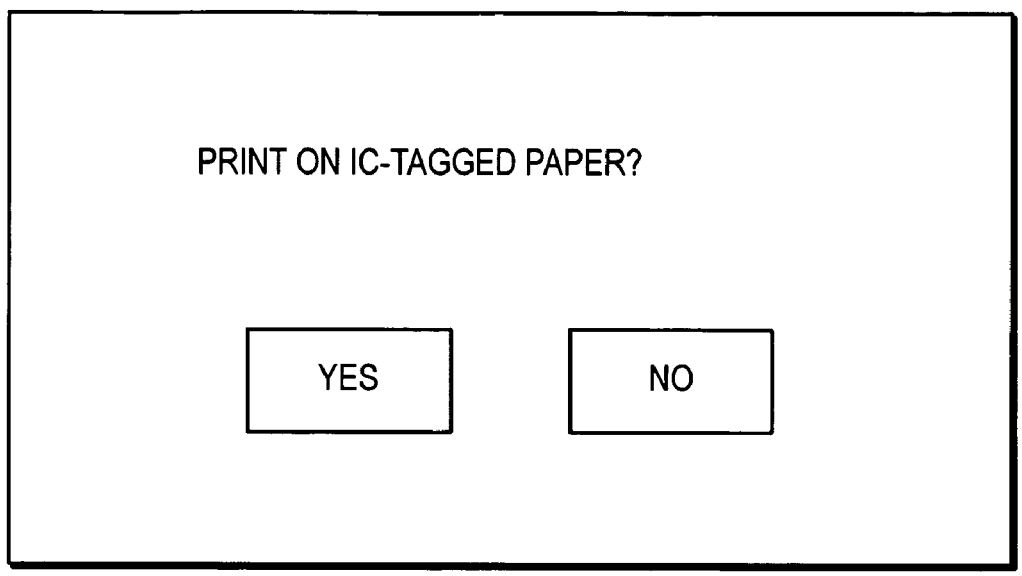
FIG. 9 is an example screen to be displayed on a touch panel of operating unit 130 of MFP 100A.

On the other hand, if it receives an instruction input for printing the original image data in step S112 (S112: Yes), it proceeds to step S113 shown in FIG. 6 and reads the original image data from the IC tag of an IC-tagged document set on document tray 145 by means of IC tag reader 143A and saves it to memory unit 120 (S113). It displays a printing instruction input screen for printing on IC-tagged printing paper on the touch panel of operating unit 130 as shown in screen 430 of FIG. 9 (S114), and accepts an instruction input of whether it should be printed on the IC-tagged printing paper or not (S115). If an instruction for printing on the IC-tagged printing paper is received in step S115 (S115: Yes), it prints the original image data on the IC-tagged printing paper based on the attribute information by means of printing unit 151 (S116), writes the original image data and the attribute information on the IC tag by means of IC writer 152 (S117), and discharges the printing paper to discharge tray 154 (S106).

On the other hand, if no instruction for printing on the IC-tagged printing paper is received in step S115 (S115: No), it prints the original image data on conventional printing paper based on the attribute information (S118), and discharges the printing paper to discharge tray 154 (S106).

Next, the outline of the actions of MFP 100B as an image forming device according to the second embodiment of the present invention will be described. MFP 100B is assumed here to have a similar constitution as MFP 100A according to said first embodiment (see FIG. 1 and FIG. 2).

Figure 10:
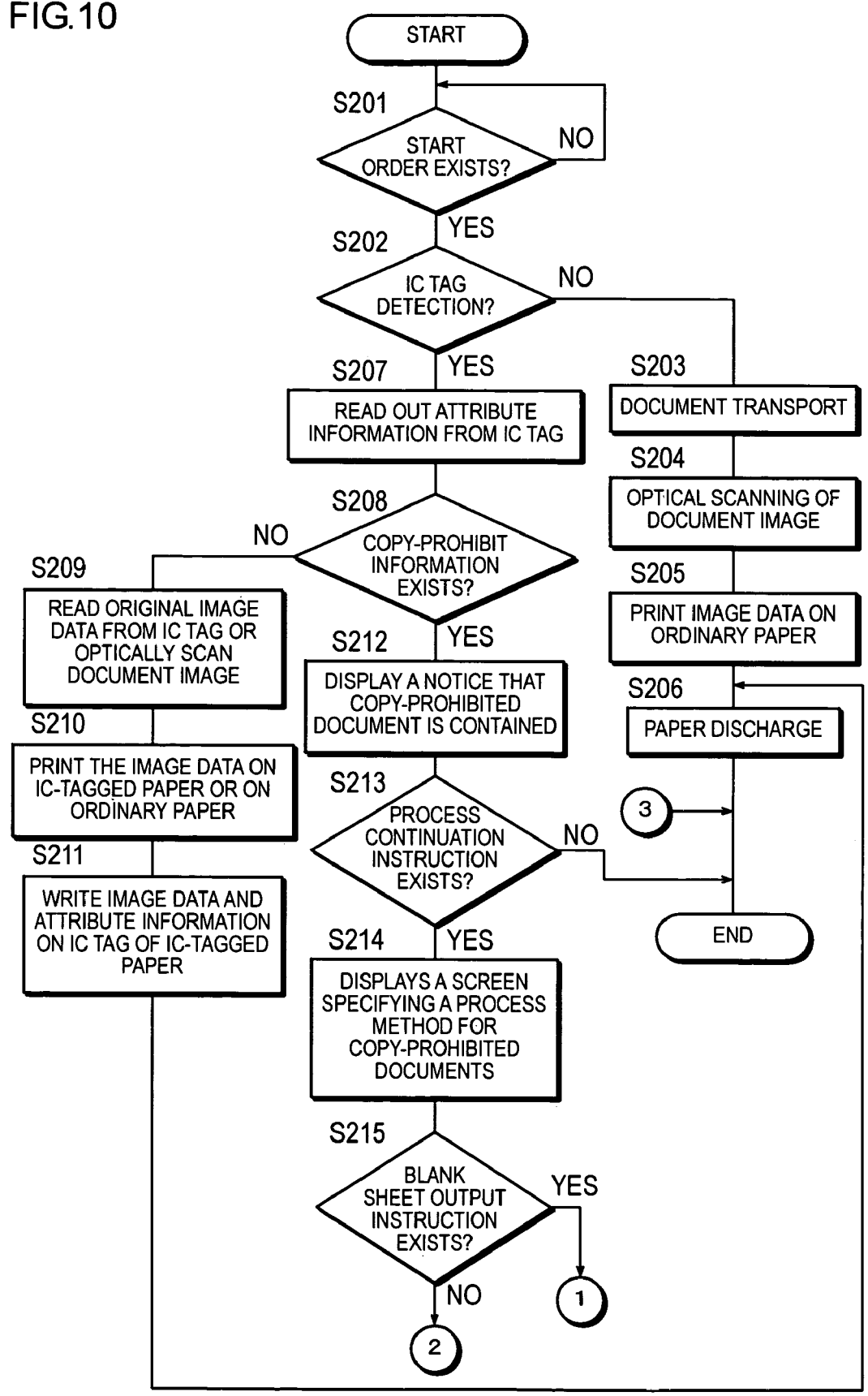
FIG. 10 is a flowchart showing the sequence of image forming process of an MFP 100B concerning a second embodiment of the invention.
Figure 11:
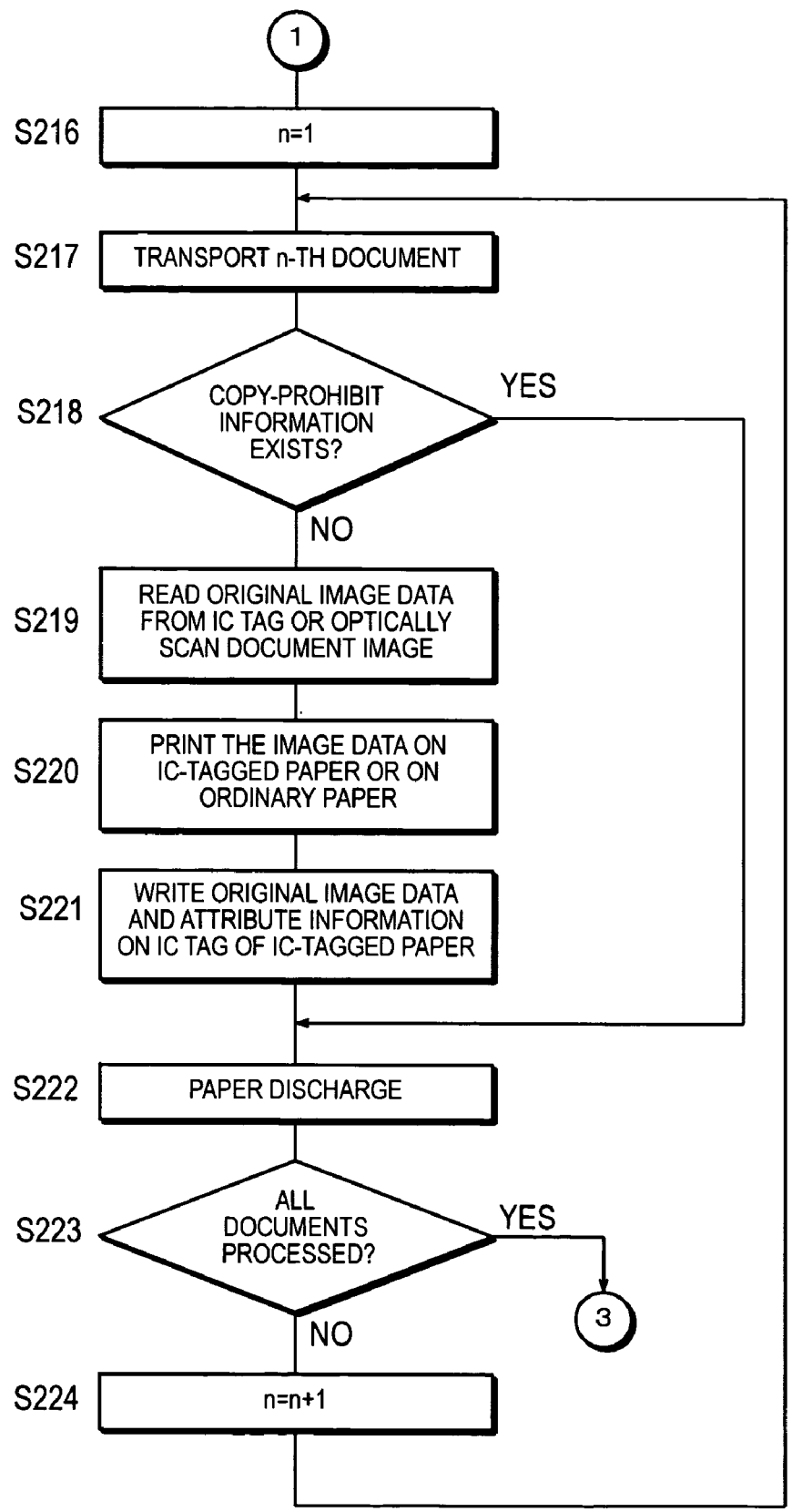
FIG. 11 is a flowchart showing the sequence of image forming process by means of MFP 100B.
Figure 12:
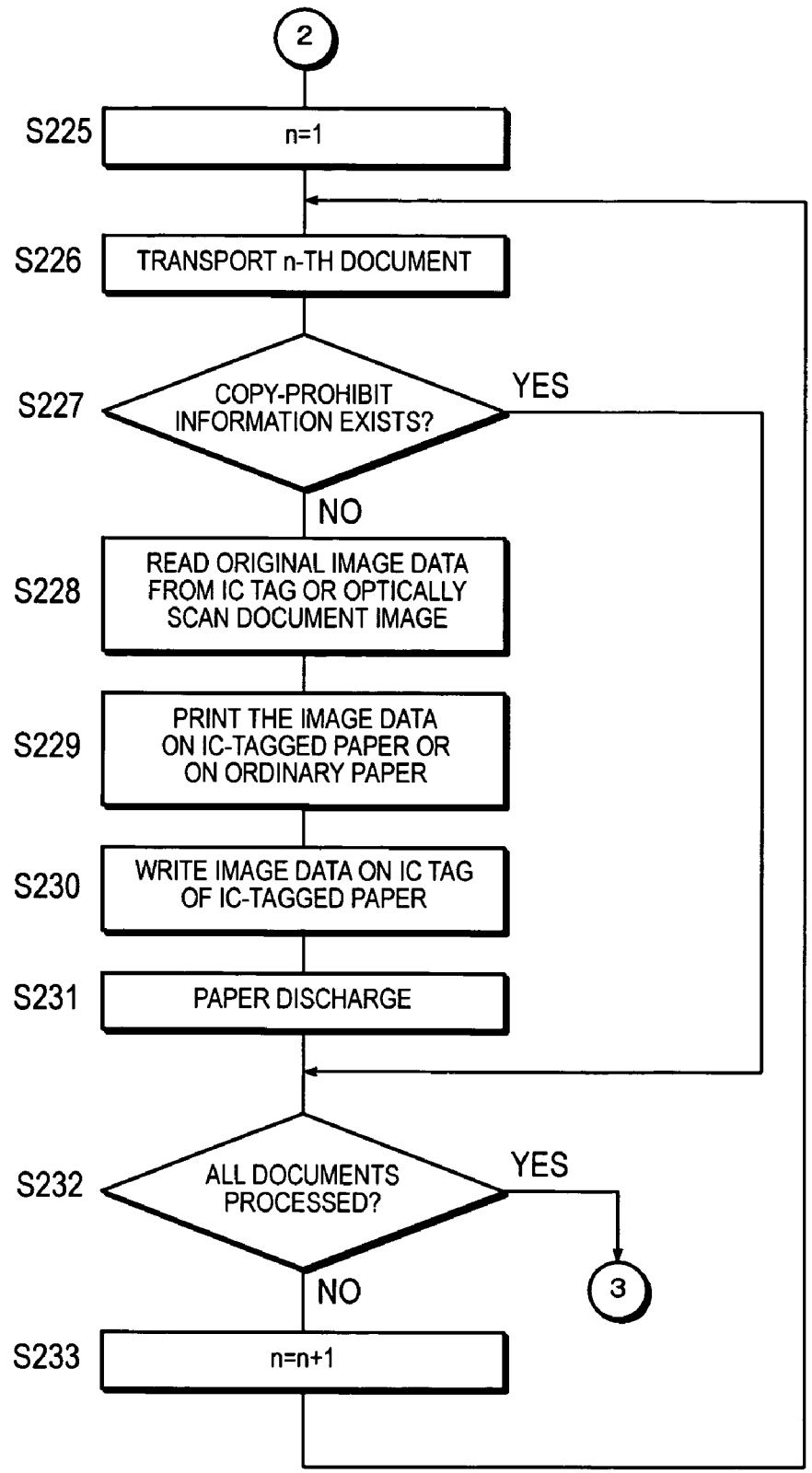
FIG. 12 is a flowchart showing the sequence of image forming process by means of MFP 100B.

FIG. 10 through FIG. 12 represent a flowchart showing the image forming process of MFP 100B according to this embodiment. The algorithm indicated by the flowchart of FIG. 10-FIG. 12 is stored as a control program on memory 120 of MFP 100B, read out and executed by control unit 110 when the operation starts.

In FIG. 10, MFP 100B stands by until it is ordered to start image processing (S201: No). The user sets the document on document tray 145, specifies the printing condition such as the number of copies to be printed and the type and size of printing paper from operating unit 130, and presses the start key.

Upon receiving an instruction for startup from operating unit 130 (S201: Yes), MFP 100B searches an IC tag of the document set on document tray 145 by means of IC tag reader 143A, and makes a judgment whether the document is an IC-tagged document or not (S202). If an IC tag is not detected in step S202, it judges that the document set on document tray 145 is a normal document (S202: No), transports the document set on document tray 145 to the specified scanning position of document table 146 by means of ADF 141 (S203), scans the document image by optical scanning unit 142 and converts it to image data (S204), prints it on conventional paper according to the printing condition by means of printing unit 151 (S2n/0.05), and discharge the printed paper into discharge tray 154 (S206).

If an IC tag is detected in step S102, it judges that the document set on document tray 145 is an IC-tagged document (S202: Yes), reads the attribute information of said document by means of IC tag reader 143A from the IC tag of the IC-tagged document set on document tray 145 to store it into memory unit 120 (S207), and determines whether any copy-prohibiting information is included in the attribute information read out (S208).

If it is determined that the attribute information does not contain copy-prohibiting information in step S208 (S208: No), it executes a process similar to the one described in steps S110-S118 described above. In other words, it either reads the original image data from the IC tag, or obtains image data by scanning the document image by optical scanning, depending on the presence or absence of the original image data (S209), prints either of them on the IC-tagged printing paper or the conventional printing paper respectively (S210), writes the original image data and the attribute information on the IC tag in case of the IC-tagged printing paper (S211), and discharges the printing paper (S206).

If it is determined that the attribute information contains copy-prohibiting information in step S208 (S208: Yes), it indicates a fact that a document that prohibits copying is contained on the touch panel of operating unit 130 as shown in screen 440 of FIG. 13 (S212), and accept an instruction input indicating whether to continue the process on documents that can be copied or not (S213) When it is instructed to cancel the process in step S213 (S213: No), it terminates the image forming process.

If it is instructed to continue the process in step S213 (S213: Yes), it displays a process method indicating screen for a copy-prohibited document on the touch panel of operating unit 130 as shown in screen 450 of FIG. 14 (S214), and accepts an instruction input of how to process a copy-prohibited document (S215). In this embodiment, either one of the modes: "Output blank paper"; or "No printing" can be specified as a processing method for a copy-prohibited document as indicated in screen 450. "Output blank paper" here means a mode of issuing a blank paper of printing paper without printing document image, which is selected for issuing a blank paper of printing paper for a copy-prohibited document in order not to disrupt the intended layouts in case of double-sided printing, N in 1 (laying out N-page of data on a single page of output data), booklet printing, etc. "No printing" is a mode for no output and is selected when it is desired to save cost and time by eliminating unnecessary output by issuing no output for a copy-prohibited document.

When "Output blank paper" is specified in step S215 (S215: Yes), it proceeds to step S216 of FIG. 11, transports the first sheet of the document set on document tray 145 to a specified scanning position on document table 146 by means of ADF 141 (S216 and S217), searches IC tag by means of IC tag reader 143B to determine whether there is any copy-prohibiting information in IC tag of the document and determines whether the document on document table 146 is copy-prohibited (S218). If no copy-prohibiting information is detected from the document on document table 146 (S218: No), it executes a process identical to the process described in steps S110-S118. In other words, it either reads the original image data from the IC tag, or obtains image data by scanning the document image by optical scanning, depending on the presence or absence of the original image data (S219), prints either of them on the IC-tagged printing paper or the conventional printing paper depending on the presence or absence of an instruction for printing on the IC-tagged printing paper (S220), writes the original image data and the attribute information on the IC tag in case of the IC-tagged printing paper (S211), and discharges the printing paper (S222). Also, if copy-prohibiting information is detected from the document on document table 146 in step S218, it judges that it is a copy-prohibited document (S218: Yes), and discharges the IC-tagged printing paper as a blank paper, i.e., without printing the document image on it, to paper discharge tray 154 (S222). It repeats the same process for the rest of the unprocessed document (S223: No, S224, and S217-S222), and terminates the image forming process when all the documents are processed (S223: Yes).

When "No printing" is specified in step S215 (S215: No), it proceeds to step S225 of FIG. 12, executes a process identical to the process described in steps S217-S222 on the first sheet of the document set on document tray 145 (S225-S231). However, if no copy-prohibiting information is detected from the document on document table 146 in step 227, it is judged to be a copy-prohibited document (S227: Yes) and proceeds to the next document providing no output. It repeats the same process for the rest of the unprocessed document (S232: No, S233, and S226-S231), and terminates the image forming process when all the documents are processed (S232: Yes).

The invention is not limited to the embodiment described above, but also can be changed in various ways within the scope of the claims.

For example, in each of the embodiments described above, image output unit 150 can be so constituted not just to print the image data on IC-tagged printing paper or conventional printing paper by means of printing unit 151 or to write it on the IC tag of the IC-tagged printing paper by means of IC tag writer 152, but also to transmit it to external equipment via output interface 153.

Although MFP is used as an example of the image forming device according to the present invention, MFP 100 can be a copying machine dedicated for copying IC-tagged printed matters (copying to conventional printing paper from IC-tagged printed matters) or a copying machine dedicated for preparing IC-tagged printed matters (copying to IC-tagged printing paper from IC-tagged printed matters).

The image forming method and the image forming device according to this invention can be realized by a dedicated hardware circuit for executing the abovementioned steps, or by causing a CPU to execute a program where said steps are described. If the present invention is to be materialized by the latter means, said programs for operating the image forming device can be provided by computer-readable recording media such as a floppy® disk and CD-ROM, or can be provided on-line via a network such as the Internet. In this case, the program recorded on the computer readable recording medium is normally transported to and stored in a memory device such as ROM and a hard disk. The program can also be provided as independent application software or can be built into the software of the image forming device as a part of its function.

As described above, the image forming device of the present invention judges whether any copy-prohibiting information is included in attribute information read from electronic tag of electronically tagged document, and cancels output if any copy-prohibiting information is included, so that it can securely prevent the user from copying a document without knowing that its copying is prohibited. In particular, while a conventional image forming device transports a document to the reading position by an ADF, scans the document image, and then performs a necessary process such as image forming cancellation if a copy-prohibiting information is found, the image forming device according to the present invention cancels the image forming process without transferring the document by an ADF as soon as it finds copy-prohibiting information in the document's IC tag, so that it can skip wasteful processes such as document transportation and minimizes damages and smearing that might result from the transportation.

Also, when there is a mixture of the printed matter with electronic tag containing copy-prohibiting information and the printed matter with electronic tag containing no copy-prohibiting information, the image forming device according to the present invention can automatically discern the presence or absence of copy-prohibiting information, and issue image data as output, reading only the document that does not contain copy-prohibiting information from electronic tag, thus efficiently outputting only document that is allowed to be copied.

Also, the image forming device according to the present invention can maintain the layout of output when special printing features such as double-side printing are specified by printing blank paper for the document that contain copy-prohibited information.

Also, the image forming device according to the present invention can eliminate wasteful cost and processing time by skipping unnecessary output by not printing documents containing copy-prohibiting information.

What is claimed is:

1. An image forming device comprising:
   a first reading unit for reading attribute information of an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, from said electronic tag;
   a judging unit for judging whether copy-prohibiting information exists in the attribute information read by said first reading unit or not;
   a second reading unit for reading said image data from said electronic tag when said judging unit judges that no said copy-prohibiting information exists; and
   a printing unit for printing an image corresponding to said image data read by said second reading unit; wherein
   said second reading unit does not read the image data from said electronic tag when said judging unit judges that said copy-prohibiting information exists; and
   said printing unit cancels a printing process when said judging unit judges that said copy-prohibiting information exists.

2. Image forming device of claim 1 further comprising:
   a display unit for displaying an indication that said electronically tagged printed matter is not allowed to be copied when said judging unit judges that said copy-prohibiting information exists.

3. An image forming device of claim 1, wherein
   said printing unit prints the image corresponding to said image data on another electronically tagged printing paper equipped with another electronic tag for storing electronic data in a certain part of the printing paper, further comprising:
   a writing unit for writing the image data corresponding to the image printed by said printing unit on the another electronic tag of the another electronically tagged printing paper on which the image corresponding to the image data is printed by said printing unit.

4. Image forming device of claim 1, wherein
   said electronic tag transmits or receives said electronic data by wireless communications.

5. An image forming device comprising:
   a transporting unit for transporting an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, one sheet at a time to a specified reading position;
   a first reading unit for reading attribute information of the electronically tagged printed matter transported by said transporting unit from its electronic tag;
   a judging unit for judging whether copy-prohibiting information exists in the attribute information read by said first reading unit or not;
   a second reading unit for reading said image data from the electronic tag of the electronically tagged printed matter if it is judged that no said copy-prohibiting information exists in the attribute information by said judging unit; and
   a printing unit for printing an image corresponding to said image data read by said second reading unit; wherein
   said second reading unit does not read said image data from the electronic tag of the electronically tagged printed matter if it is judged that said copy-prohibiting information exists in the attribute information by said judging unit.

6. An image forming device of claim 5, wherein
   said printing unit issues a blank paper as an output for the electronically tagged printed matter if it is judged that said copy-prohibiting information exists in the attribute information by said judging unit.

7. An image forming device of claim 5, wherein said printing unit issues no output for the electronically tagged printed matter if it is judged that said copy-prohibiting information exists in the attribute information by said judging unit.

8. An image forming device of claim 5, wherein
   said printing unit prints the image corresponding to said image data on another electronically tagged printing paper equipped with another electronic tag for storing electronic data in a certain part of the printing paper, further comprising:
   a writing unit for writing the image data corresponding to the image printed by said printing unit on the another electronic tag of the another electronically tagged printing paper on which the image corresponding to the image data is printed by said printing unit.

9. Image forming device of claim 5, wherein
   said electronic tag transmits or receives said electronic data by wireless communications.

10. An image forming method comprising:
    a first reading step of reading attribute information of an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, from said electronic tag;
    a judging step of judging whether copy-prohibiting information exists in the attribute information read by said first reading step or not;
    a second reading step of reading said image data from said electronic tag when said judging step judges that no said copy-prohibiting information exists; and a printing step of printing an image corresponding to said image data read by said second reading step; wherein said second reading step does not read the image data from said electronic tag when said judging step judges that said copy-prohibiting information exists; and said printing step cancels a printing process when said judging step judges that said copy-prohibiting information exists.

11. Image forming method of claim 10 further comprising:

a display step of displaying an indication that said electronically tagged printed matter is not allowed to be copied when said judging step judges that said copy-prohibiting information exists.

12. An image forming method of claim 10, wherein said printing step prints the image corresponding to said image data on another electronically tagged printing paper equipped with another electronic tag for storing electronic data in a certain part of the printing paper, further comprising:

a writing step of writing the image data corresponding to the image printed by said printing step on the another electronic tag of the another electronically tagged printing paper on which the image corresponding to the image data is printed by said printing step.

13. Image forming method of claim 10, wherein said electronic tag transmits or receives said electronic data by wireless communications.

14. An image forming method comprising:

a transporting step of transporting an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, one sheet at a time to a specified reading position;

a first reading step of reading attribute information of the electronically tagged printed matter transported by said transporting step from its electronic tag;

a judging step of judging whether copy-prohibiting information exists in the attribute information read by said first reading step or not;

a second reading step of reading said image data from the electronic tag of the electronically tagged printed matter which is judged that no said copy-prohibiting information exists in the attribute information by said judging step; and a printing step of printing an image corresponding to said image data read by said second reading step; wherein said second reading step does not read said image data from the electronic tag of the electronically tagged printed matter if it is judged that said copy-prohibiting information exists in the attribute information by said judging step.

15. An image forming method of claim 14, wherein said printing step issues a blank paper as an output for the electronically tagged printed matter if it is judged that said copy-prohibiting information exists in the attribute information by said judging step.

16. An image forming method of claim 14, wherein said printing step issues no output for the electronically tagged printed matter if it is judged that said copy-prohibiting information exists in the attribute information by said judging step.

17. An image forming method of claim 14, wherein said printing step prints the image corresponding to said image data on another electronically tagged printing paper equipped with another electronic tag for storing electronic data in a certain part of the printing paper, further comprising:

a writing step of writing the image data corresponding to the image printed by said printing step on the another electronic tag of the another electronically tagged printing paper on which the image corresponding to the image data is printed by said printing step.

18. Image forming method of claim 14, wherein said electronic tag transmits or receives said electronic data by wireless communications.

19. A computer readable medium storing an image forming computer program for causing an image forming device to execute:

a first reading step of reading attribute information of an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, from said electronic tag;

a judging step of judging whether copy-prohibiting information exists in the attribute information read by said first reading step or not;

a second reading step of reading said image data from said electronic tag when said judging step judges that no said copy-prohibiting information exists; and a printing step of printing an image corresponding to said image data read by said second reading step; wherein said second reading step does not read the image data from said electronic tag when said judging step judges that said copy-prohibiting information exists; and said printing step cancels a printing process when said judging step judges that said copy-prohibiting information exists.

20. The computer readable medium storing the image forming computer program of claim 19 further causing an image forming device to execute:

a display step of displaying an indication that said electronically tagged printed matter is not allowed to be copied when said judging step judges that said copy-prohibiting information exists.

21. The computer readable medium storing the image forming computer program of claim 19, wherein said printing step prints the image corresponding to said image data on another electronically tagged printing paper equipped with another electronic tag for storing electronic data in a certain part of the printing paper, for further causing an image forming device to execute:

a writing step of writing the image data corresponding to the image printed by said printing step on the another electronic tag of the another electronically tagged printing paper on which the image data is printed by said printing step.

22. The computer readable medium storing the image forming computer program of claim 19, wherein said electronic tag transmits or receives said electronic data by wireless communications.

23. A computer readable medium storing an image forming computer program image forming device to execute:

a transporting step of transporting an electronically tagged printed matter wherein an image corresponding to image data is printed on an electronically tagged printing paper equipped with an electronic tag for storing electronic data in a certain part of the printing paper and said electronic tag stores said image data corresponding to said image printed on said electronically tagged printing paper, one sheet at a time to a specified reading position;

a first reading step of reading attribute information of the electronically tagged printed matter transported by said transporting step from its electronic tag;

a judging step of judging whether copy-prohibiting information exists in the attribute information read by said first reading step or not;

a second reading step of reading said image data from the electronic tag of the electronically tagged printed matter if it is judged that no said copy-prohibiting information exists in the attribute information by said judging step; and a printing step of printing an image correspond to said image data read by said second reading step; wherein said second reading step does not read said image data from the electronic tag of the electronically tagged printed matter if it is judged that said copy-prohibiting information exists in the attribute information by said judging step.

24. The computer readable medium storing the image forming computer program of claim 23, wherein said printing step issues a blank paper as an output for the electronically tagged printed matter if it is judged that said copy-prohibiting information exists in the attribute information by said judging step.

25. The computer readable medium storing the image forming computer program of claim 23, wherein said printing step issues no output for the electronically tagged printed matter if it is judged that said copy-prohibiting information exists in the attribute information by said judging step.

26. The computer readable medium storing the image forming computer program of claim 23, wherein said printing step prints the image corresponding to said image data on another electronically tagged printing paper equipped with another electronic tag for storing electronic data in a certain part of the printing paper, for further causing an image forming device to execute:

a writing step of writing the image data corresponding to the image printed by said printing step on the another electronic tag of the another electronically tagged printing paper on which the image corresponding to the image data is printed by said printing step.

27. The computer readable medium storing the image forming computer program of claim 23, wherein said electronic tag transmits or receives said electronic data by wireless communications.

* * * * *